G. H. BOTS & W. H. WHITE.
Whiffletree.
No. 161,742.  Patented April 6, 1875.
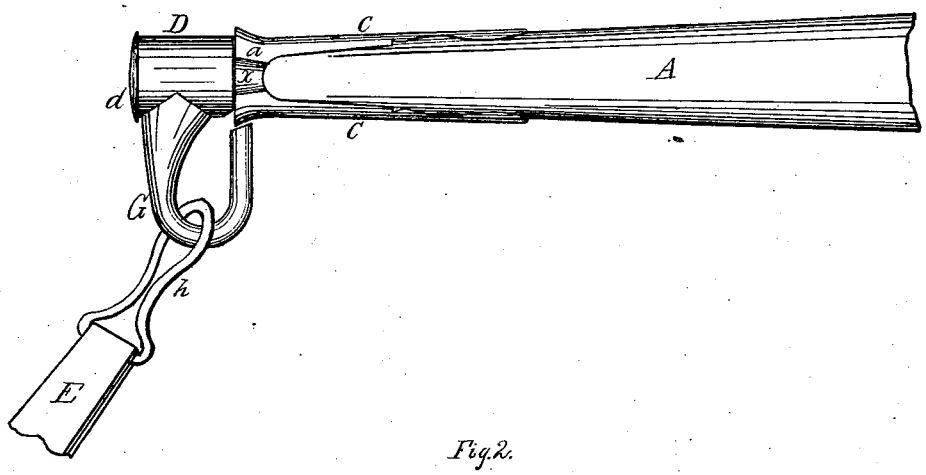
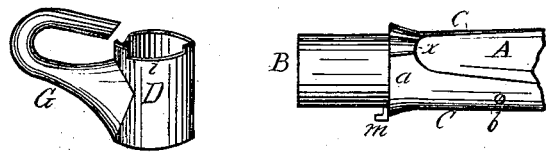

UNITED STATES PATENT OFFICE.

GEERT H. BOTS AND WILLIAM H. WHITE, OF ZEELAND, MICHIGAN.

IMPROVEMENT IN WHIFFLETREES.

Specification forming part of Letters Patent No. 161,742, dated April 6, 1875; application filed October 13, 1874.

*To all whom it may concern:*

Be it known that we, GEERT H. BOTS and WM. H. WHITE, of Zeeland, county of Ottawa and State of Michigan, have invented certain new and useful Improvements in Trace-Fastener, of which the following is a specification:

The nature of our invention consists in the construction and arrangement of a trace-fastener, as will be hereinafter more fully set forth.

In order to enable others skilled in the art to which our invention appertains to make and use the same, we will now proceed to describe its construction and operation, referring to the annexed drawing, which forms a part of this specification, and in which—

Figure 1 is a plan view of one end of a whiffletree with our trace-fastener applied thereto; and Fig. 2 shows the two parts of the trace-fastener detached, in perspective.

A represents an ordinary whiffletree, the ends of which are formed with round tenons. Over each end of the whiffletree is passed a metal ferrule, B, which is formed at its inner end with a circumferential shoulder, $a$, and from this extend two straps, C C, along the front and rear of the whiffletree. These straps are fastened, by screws, rivets, or bolts $b$, to the whiffletree. On the ferrule B is placed a sleeve, D, which is held thereon and prevented from coming off by means of a washer, $d$, and screw $e$, as shown. From the sleeve D extends a hook, G, which is bent inward and backward toward the whiffletree, the point of the hook coming close up to the shoulder $a$. E represents the trace, provided at its end with a metal loop, $h$, which is to be passed into the hook G. This can only be done when the trace hangs vertically downward, as then the end of the hook is opposite a notch or groove, $x$, made in the shoulder $a$ for that purpose. The movement of the sleeve D is limited by means of hook or pin $m$, passed through the ferrule B into the whiffletree close up against the shoulder $a$, and working in a slot, $i$, made in the inner end of the sleeve, which allows the sleeve to turn so as to bring the hook G from a horizontal position to a perpendicular, and vice versa, or, in other words, to make only one-fourth of a revolution.

The trace is easily attached and detached when desired, and is not liable to become accidentally unhooked when in use.

Having thus fully described our invention, what we claim as new, and desire to secure by Letters Patent, is—

1. The sleeve D, provided with the hook G, in combination with the ferrule B, having shoulder $a$, with notch or groove $x$, and the straps C C, all constructed to operate substantially as and for the purposes set forth.

2. In combination with the whiffletree A, ferrule B, and sleeve D, the L-shaped pin $m$, to work in the slot $i$ on the sleeve D, for the purposes set forth.

3. The combination, with a whiffletree, A, of the ferrule B, with grooved shoulder $a$ and straps C C, the sleeve D, with hook G and slot $i$, the pin $m$, washer $d$, and screw $e$, all substantially as and for the purposes set forth.

In testimony that we claim the foregoing as our invention we hereunto affix our signatures this 7th day of October, 1874.

GEERT H. BOTS.
      WM. H. WHITE.

Witnesses:
 JACOB DEN HERDER,
 JANDEN HERDER.